Jan. 14, 1964 W. J. BARTIK 3,117,368

METHOD AND APPARATUS FOR WIRING MEMORY ARRAYS

Filed Jan. 26, 1956

INVENTOR.
WILLIAM J. BARTIK
BY
Charles C. English
AGENT

United States Patent Office 3,117,368
Patented Jan. 14, 1964

3,117,368

METHOD AND APPARATUS FOR WIRING MEMORY ARRAYS

William J. Bartik, Hatboro, Pa., assignor to Sperry Rand Corporation, New York, N.Y., a corporation of Delaware Filed Jan. 26, 1956, Ser. No. 561,540
15 Claims. (Cl. 29—155.56)

The present invention relates to memory arrays of the type employing a plurality of magnetic toroids; and is more particularly concerned with a novel rigid array. In addition, the present invention teaches improved methods of wiring the novel array to be discussed, as well as for wiring known types of magnetic core arrays.

It is known to provide information storage devices comprising a plurality of cores, for instance of a ferrite or other magnetic material, linked by pluralities of control conductors whereby the said cores may be individually driven in a plurality of coordinates. In general, the cores employed are of extremely small size thereby raising a serious handling problem; and known types of arrays are in general wired by relatively pliant wires, for instance of soft copper, thereby to permit the said wires to be distorted somewhat in the wiring of the array. It will be appreciated that when such soft copper wires are employed, as has been the case in the past, the resulting array is relatively expensive due to the fact that considerable care must be taken to avoid kinking the wire as it is threaded through the several cores comprising the array. Other disadvantages such as lack of structural strength, etc. are present in such non-rigid arrays.

In addition it has been found that, because of the soft nature of the wire employed heretofore, such wire tends to elongate during an array threading operation, thus making it impractical to prestrip the wire, prior to wiring of the array, for the subsequent making of solder connections since the said wire elongation tends to vary the locations of the prestripped areas as the array is wired. Also, due to the use of soft wire in known types of memory arrays, the wired array is subject to mechanical movement of the several control conductors with respect to one another and with respect to the magnetic toroids comprising the array, whereby it becomes difficult to predetermine the nature of cancellation signals which may be required to overcome coupling between a drive line and an output line associated with a given core.

Notwithstanding all of the foregoing and other disadvantages of soft wire arrays, such arrays have nevertheless been employed in the past, inasmuch as the techniques known heretofore for the wiring of arrays have required that the wires be flexible enough to permit compensation for variations in the relative disposition between the plural cores comprising the array.

The present invention serves to obviate the foregoing difficulties of known non-rigid arrays through the provision of a rigid array wherein relatively stiff wires are employed in the storage device thereby permitting a more rapid wiring of the array, and permitting further economies in the manufacture of such an array. In particular, the present invention is concerned with a novel method and apparatus for so prelocating cores to be wired that relatively rigid wires may be readily passed through aligned toroidal cores; and such wires may for instance, be prestripped at their ends for the necessary subsequent soldering of terminal connections without encountering the difficulties of wire elongation or wire shifting experienced heretofore.

It is accordingly an object of the present invention to provide a novel memory array.

A further object of the present invention resides in the provision of an improved storage array comprising a plurality of magnetic cores electrically linked and mechanically supported by relatively rigid conductors.

Another object of the present invention resides in the provision of methods for wiring memory arrays more rapidly and efficiently than has been the case heretofore.

Still another object of the present invention resides in the provision of methods for more efficiently handling relatively small magnetic toroids, thereby to permit the wiring thereof.

A still further object of the present invention resides in the provision of an improved memory array and of methods for wiring the same.

Still another object of the present invention resides in the provision of improved techniques for producing a memory array having better mechanical and electrical characteristics than has been the case heretofore.

In accordance with the foregoing objects and advantages, the present invention provides a novel jig comprising a plurality of openings adapted to respectively receive a single magnetic toroid of relatively small size. A supply of toroids may be loaded into such a jig by a shaking technique, by a magnetic technique, or by combinations of such techniques; and once loaded into the jig, the said toroids are positionally predisposed in proper relation for the subsequent wiring of the over-all array. The toroids, once loaded into the jig, are thereafter withdrawn from the jig and maintained in their predetermined positional relationship by one of a number of techniques, which will be described; and a preferred such technique comprises the magnetic partial withdrawal of the toroids from the jig into forcible contact with a boundary plate spaced from the jig. When so withdrawn, and as will be described, the several magnetic toroids to be wired are maintained in accurate positional relationship with respect to one another; but are nevertheless sufficiently free of the jig to permit relatively stiff control conductors comprising for instance, cadmium bronze or beryllium copper wires, to be inserted directly through the several toroids in preselected directions. By such an arrangement, therefore, a memory array is produced more rapidly and at less expense than has been the case in plural core arrays known heretofore; and the resultant array, being of a relatively rigid nature, exhibits the improved mechanical and electrical characteristics described above.

The foregoing objects, advantages, construction and operation of the present invention will become more readily apparent from the following description and accompanying drawings, in which.

Figure 1:
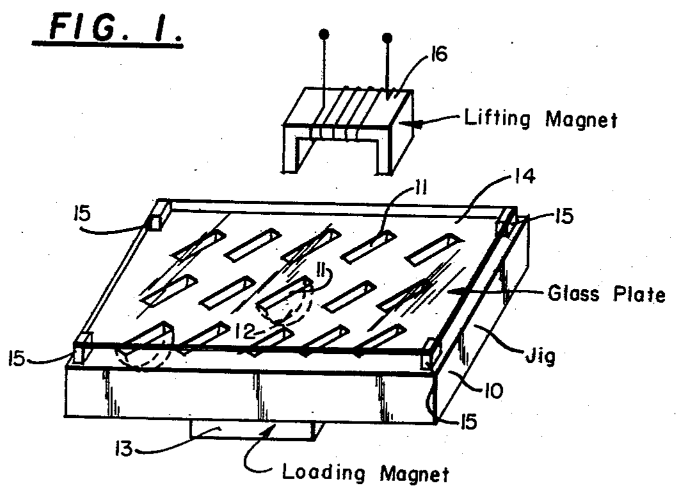
FIGURE 1 depicts an apparatus such as may be employed in the positioning of plural toroids preparatory to wiring of the same.

Referring now to FIGURE 1, it will be seen that, in accordance with the present invention, the wiring of toroidal arrays may be facilitated through the provision of a jig 10 comprising a body of non-ferrous material having a plurality of slots 11 recessed into one surface thereof. The several slots 11 are disposed with respect to one another in a positional relationship conforming to the ultimate position desired of the plural cores comprising the array; and each of these slots 11 is depressed into the jig 10, for instance as is indicated at 12, thereby to permit the reception and retention of a magnetic core within the slot.

In practice, a supply of magnetic toroids, such toroids ordinarily being of extremely small size, may be placed upon the surface of the jig 10 and the jig may then be placed upon a shaker table whereby the toroids are agitated until each of the slots 11 contains a toroid. In the alternative, the loading of toroids into the several slots 11 may be accomplished by a loading magnet 13 placed beneath the jig 10; and such a magnet will tend to draw individual toroids, of a supply of such toroids placed on the surface of jig 10, into the several slots 11, inasmuch as the magnetic field of the loading magnet 13 causes the small toroids to align themselves in a vertical plane as well as attracting the toroids themselves.

The magnetic field utilized for such loading of the toroids into the jig 10 may be derived from a permanent magnet, such as 13, which can be moved around under the loading slab or jig 10. In the alternative, the loading magnet 13 may comprise one or more electromagnets placed between the jig 10; and such electromagnets may be caused to effect a rotating field in the region of jig 10, for instance by the time sequencing of the excitation of several electromagnets. In a preferred form of the present invention, a combination of the foregoing techniques is employed to effect extremely rapid loading of the jig 10; and such a combination would comprise the simultaneous shaking of the jig 10 and application of a magnetic field to the said jig 10.

After the jig 10 is loaded, so that each of the slots 11 contains a magnetic toroid, a retaining plate 14 of glass or of other transparent sheet material, is placed over the loaded jig and is supported, for instance by upstanding projections 15, adjacent the said jig 10. Projections 15 are so dimensioned that the plate 14 is spaced from the upper surface of jig 10 by a distance slightly less than the diameter of the several toroids loaded into the slots 11. A further magnetic field, provided for instance by a lifting magnet 16, may thereafter be applied to the over-all assembly whereby the previously loaded toroids are lifted from the several slots 11 into contact with plate 14 thereby to permit wiring of the said toroids through the space defined between the upper surface of jig 10 and the lower surface of plate 14.

Figure 2:
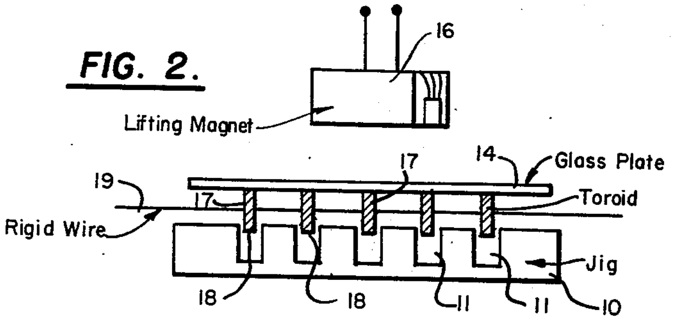
FIGURE 2 is a view illustrative of the apparatus shown in FIGURE 1, during the wiring operation.

Referring to FIGURE 2, it will be seen that once the loaded jig 10 is superposed by the plate 14 and the over-all assembly is subjected to the lifting magnetic force of magnet 16, the several magnetic toroids, such as 17, will be restrained by the glass plate 14 in such position that their lower ends 18 are still partially inserted into the several slots or depressions 11 in the jig 10. This positional relationship of the toroids 17 to to the plate 14 and jig 10 cause causes the previous positional alignment of the several toroidal cores to be maintained even when the toroids are lifted from the jig; and further permits some positional variation of the said toroids to be effected, if desired, under the control of magnet 16. In this respect, the magnet 16 is preferably freely movable in plural coordinates to permit adjustments in position of the several toroidal cores. Once the toroids 17 are lifted into the position indicated in FIGURE 2, relatively rigid wires, such as 19, may be quickly inserted through the several toroids thereby to effect an extremely efficient wiring operation of the array.

Figure 3:
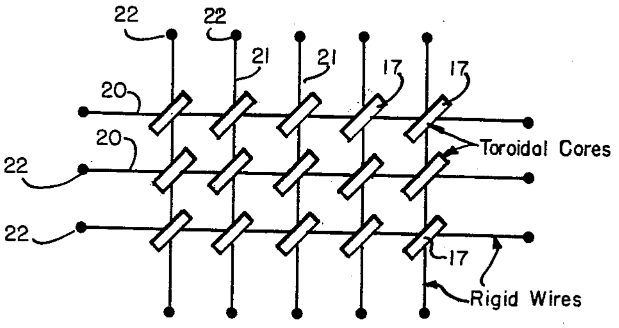
FIGURE 3 illustrates a novel array produced in accordance with the present invention.

The over-all array, indicated in FIGURE 3, will thus comprise a plurality of magnetic toroids 17 respectively linked by rigid cadmium bronze or beryllium copper wires such as 20 and 21, whereby the resulting array is rigid in configuration, and the said wires comprising the array will not tend to elongate during the wiring operation whereby they may be prestripped for the providing of solder connections, for instance at points 22. It should further be noted that, due to the rigid character of the array prepared by the present invention, the tendency for shifting or change in mechanical position between the several input and output lines comprising the array is minimized, if not completely eliminated, thereby permitting the more efficient design of electrical circuits for the elimination of coupling between the wires comprising the array.

In the particular wiring technique described above, it has been assumed that the several toroids 17 are maintained in contact with the restraining plate 14 during a wiring operation, under the control of a continuously applied lifting force, provided for instance by lifting magnet 16, during the wiring of the array. This holding function of the lifting magnet 16 may be aided by providing an adhesive layer, for instance of a glue, on the under surface of restraining plate 14 whereby once the several toroids 17 are lifted into contact with such an under surface of plate 14, they are at least partially maintained in this position by the adhesive coating. In the alternative, the adhesive coating may be utilized by itself to maintain the positional relationship of the several toroids 17, in which event the lifting magnet 16 performs a lifting function only and may be deenergized or otherwise removed once the toroids 17 are in contact with plate 14. This particular form of the present invention lends itself to a still further wiring technique whereby once the several toroids 17 are lifted into contact with the adhesively coated plate 14, the said toroids are maintained in positional relationship by the adhesive, and the plate 14 and the adhesively attached toroids 17 may then be completely removed from the region of jig 10 thereby to permit still more ready wiring of the array. When such a removal technique is practiced, the plate 14 need no longer comprise a transparent material.

Still further modifications will be suggested in accordance with the foregoing concepts. Thus, in the forms of the invention described above, the several slots 11 extend only partially into the jig 10. In an alternative form of the invention, the said slots 11 may extend completely through the jig and an adhesively coated retaining plate may be placed under the jig, whereby the several toroids to be wired may be shaken and/or magnetically drawn completely through the jig into contact with the adhesively coated retaining surface whereby, upon subsequent removal of the plate from the region of the jig, the several toroids are still maintained in accurate positional alignment with respect to one another by the adhesive coating on the plate.

Still further modifications will be suggested to those skilled in the art, and it must therefore be stressed that the foregoing description is meant to be illustrative only and should not be considered limitative of my invention. All such modifications as are in accord with the principles described are meant to fall within the scope of the appended claims.

Having thus described my invention, I claim:

1. In a wiring apparatus, the combination of a jig comprising a planar body of non-magnetic material defining a plurality of slots in a surface thereof, said slots being arranged in a plurality of rows each arranged to receive a plurality of magnetic toroids with the central holes thereof aligned, means for inserting individual ones of said toroids into individual ones of said slots thereby to align said toroids in an array, a planar restraining plate disposed substantially parallel to said slot-bearing surface of said jig, said plate being adjacent and superposed relative to said jig and spaced from said jig slightly less than the diameters of said toroids, means for simultaneously withdrawing said aligned toroids from said slots into forcible contact with said plate, means including said slots for maintaining said toroids in the same alignment as that in said jig during the withdrawal of said toroids from said slots, and means associated with said plate for holding said toroids in contact with said plate whereby said toroids remain in aligned configuration adjacent said plate thereby to permit wiring of said array, said plate being spaced from said jig slightly less than the diameter of said toroids during the wiring of said array.

2. The apparatus of claim 1 wherein said withdrawing means comprises a magnet.

3. The apparatus of claim 2 wherein said magnet is movably disposed adjacent said plate whereby the positions of said toroids adjacent said plate may be selectively varied.

4. The method of wiring an information storage array which comprises aligning the holes of a plurality of toroidal cores in a slot-bearing jig having slots of such depth that they tend to obstruct the holes in said cores, superposing a plate over said jig by a distance less than the diameter of said cores, simultaneously withdrawing said aligned toroidal cores into contact with said plate adjacent to and parallel to said jig, holding said cores in alignment and in contact with said plate, and passing wires through the aligned holes of said cores while they are in contact with said plate.

5. The method of wiring an information storage array which comprises superposing a retaining plate over a slot bearing jig by a distance slightly less than the diameter of a plurality of toroidal magnetic cores, magnetically drawing said plurality of toroidal magnetic cores into a slot-bearing jig arranged to align the holes of said cores, simultaneously withdrawing in parallel relation said aligned toroidal cores from said jig into contact with said retaining plate adjacent to and parallel to said jig, holding said cores in alignment and in contact with said plate, and passing thereafter rigid wires through the aligned holes of said cores while they are in contact with said plate while said retaining plate is maintained over said slot bearing jig a distance less than the diameter of said magnetic cores.

6. The method of claim 5 wherein said withdrawing step comprises magnetically withdrawing said aligned toroids from said jig into contact with said plate, said plate being spaced from said jig.

7. The method of wiring an information storage array which comprises inserting a plurality of individual magnetic toroids into a plurality of individual slots, respectively, in a slot-bearing jig thereby to align said toroids in an array, superposing a retaining plate over said slot-bearing jig by a distance less than the diameter of said toroids, simultaneously forcing said aligned toroids from said slots and into contact with said retaining plate spaced from and substantially parallel to said jig, holding said cores in alignment and in contact with said plate, and passing wires in a plurality of coordinates through said aligned toroids while they are in contact with said plate when said plate is spaced from said jig by a distance less than the diameter of said toroids.

8. In a wiring apparatus, the combination of a jig comprising a planar body of non-magnetic material defining a plurality of slots in a surface thereof, said slots being arranged in a plurality of rows each arranged to receive a plurality of magnetic toroids with the central holes thereof aligned, means for inserting individual ones of said toroids into individual ones of said slots thereby to align the holes in said toroids in an array, a flat, rigid retaining member adapted to be disposed substantially parallel to said slot-bearing surface of said jig, and adhesive means on a surface of said member to simultaneously engage said toroids aligned in said slots at their outer edges and to retain them in alignment, whereby said toroids tend to be held in rigidly aligned configuration on said member and said holes are unobstructed to permit wiring of said array.

9. The method of wiring an information storage array which comprises inserting a plurality of individual magnetic toroids into a plurality of individual slots, respectively, in a slot-bearing jig thereby to align said toroids along a plurality of coordinates in an array, forcing the outer edges of said aligned toroids into contact with a superposed, rigid, flat, adhesive-coated retaining member so that said toroids are held in substantially rigid alignment with the axes of the holes of the toroids substantially parallel to said member and with said holes unobstructed and moving said retaining member to simultaneously withdraw said toroids from said jig slots, and threading wires along a plurality of coordinates through said aligned toroids while they are held on said member.

10. In a wiring apparatus for magnetic toroids, the combination of a jig comprising a non-magnetic planar body of material defining a plurality of openings arranged for the reception of magnetic toroids and alignment of the central holes of said magnetic toroids, a planar retaining plate superposed with respect to said jig and substantially parallel to said jig adjacent said openings, means for simultaneously magnetically drawing toroids from said openings in parallel relation into contact with said plate, and means including said openings for maintaining said toroids in the same alignment as that in said jig during the withdrawal of said toroids from said openings and for maintaining said toroids in alignment during the wiring of said toroids, whereby wires may be threaded through said toroids.

11. The apparatus of claim 10 to be used with toroids of a certain diameter wherein said plate comprises a transparent material above said parallel body, said body including means for positioning said plate to be spaced from said body by a distance less than the diameter of said toroids, whereby said toroids remain partially inserted in said depressions when said toroids are in contact with said plate.

12. In a wiring apparatus for magnetic toroids, the combination of a jig comprising a non-magnetic planar body of material defining a plurality of openings extending through said jig and arranged for the reception of magnetic toroids and alignment of the central holes of said magnetic toroids, a substantially planar element substantially parallel to said jig adjacent and below said openings and spaced from said jig a distance less than the diameter of said magnetic toroids to permit alignment of said central holes, means for separating said toroids from said openings and to maintain said toroids in contact with said planar element, means associated with said planar element for holding said toroids in aligned contact with said planar element, and means for maintaining said toroids in the same alignment as that in said jig during the simultaneous separation of said toroids from said openings and during the wiring of said toroids.

13. In a wiring apparatus the combination of a jig comprising a planar body of non-magnetic material defining a plurality of slots in a surface thereof, said slots being arranged in a plurality of rows each arranged to receive a plurality of magnetic toroids with the central holes thereof aligned, means for inserting individual ones of said toroids into individual ones of said slots thereby to align said toroids in an array, a planar restraining plate having an adhesive surface superposed substantially parallel to and adjacent said slot-bearing surface of said jig, means for simultaneously withdrawing said aligned toroids from said slots into forcible contact with said plate, means including said slots for maintaining said toroids in the same alignment as that in said jig during the withdrawal of said toroids from said slots, and the adhesive surface associated with said plate holding said toroids, whereby said toroids remain in aligned configuration adjacent said plate during the wiring of said array.

14. The method of wiring an information storage array which comprises magnetically drawing a plurality of toroidal magnetic cores into a slot-bearing jig arranged to align the holes of said cores, magnetically and simultaneously withdrawing in parallel relation said aligned toroidal cores from said jig into contact with a retaining plate superposed with respect to said jig and adjacent to and parallel to said jig, holding said cores in alignment and in contact with said plate, and thereafter passing rigid wires through the aligned holes of said cores while they are in contact with said plate.

15. In a wiring apparatus for magnetic toroids, the combination of a jig comprising a non-magnetic planar body of material defining a plurality of openings arranged for the reception of magnetic toroids and alignment of the central holes of said magnetic toroids, a planar retaining plate superposed with respect to said jig and substantially parallel to said jig adjacent said openings, said plate having an adhesive coating adjacent said body, means for magnetically drawing toroids simultaneously from said openings in parallel relation into contact with said plate whereby said toroids are held in aligned relation by said adhesive coating and means including said openings for maintaining said toroids in the same alignment as that in said jig during the withdrawal of said toroids from said openings, whereby wires may be threaded through said toroids.

References Cited in the file of this patent

UNITED STATES PATENTS

| | | |
|---|---|---|
| 1,215,735 | Stacey | Feb. 13, 1917 |
| 1,325,325 | Janke | Dec. 16, 1919 |
| 1,988,734 | Helgason | Jan. 22, 1935 |
| 2,226,440 | Parker | Dec. 24, 1940 |
| 2,251,326 | Cullin | Aug. 5, 1941 |
| 2,334,004 | Herzog | Nov. 9, 1943 |
| 2,503,467 | Blind | Apr. 11, 1950 |
| 2,507,559 | D'Andrea | May 16, 1950 |
| 2,550,898 | Youngblood et al. | May 1, 1951 |
| 2,584,021 | Jackson | Jan. 29, 1952 |
| 2,603,246 | Dockery | July 15, 1952 |
| 2,654,142 | Horelick | Oct. 6, 1953 |
| 2,700,150 | Wales | Jan. 18, 1955 |
| 2,712,126 | Rosenberg et al. | June 28, 1955 |
| 2,724,103 | Ashenhurst | Nov. 15, 1955 |
| 2,985,948 | Peters | May 30, 1961 |